Jan. 2, 1940.  R. D. CLEMSON  2,185,833
MOWER
Filed June 18, 1937
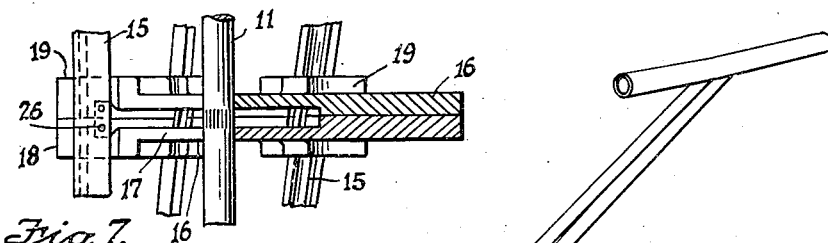
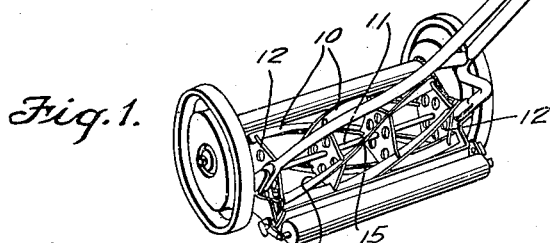
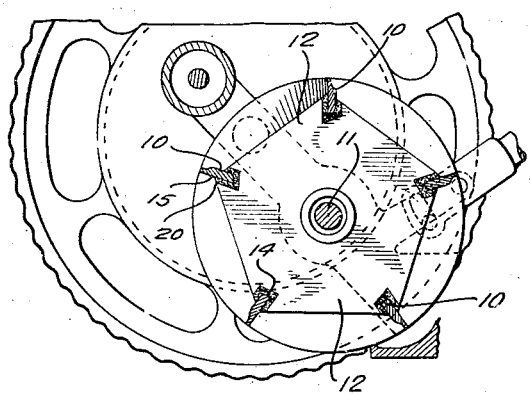
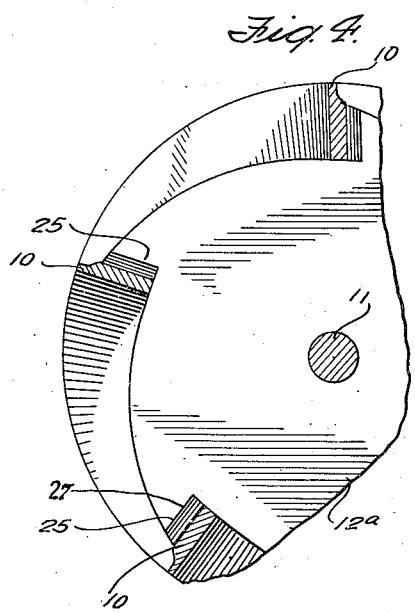
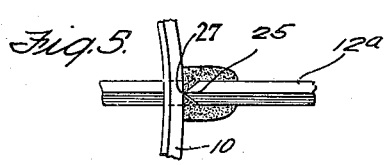
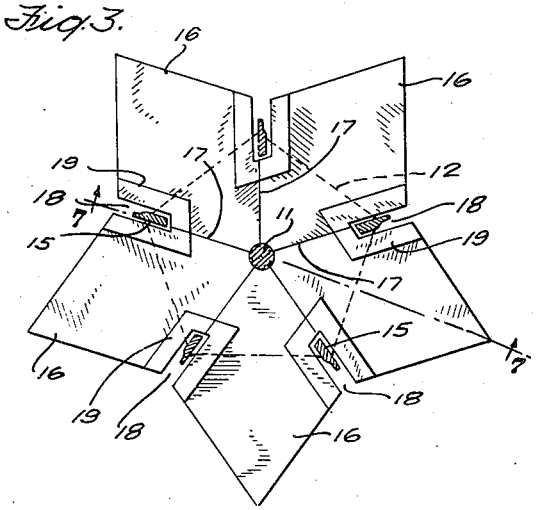
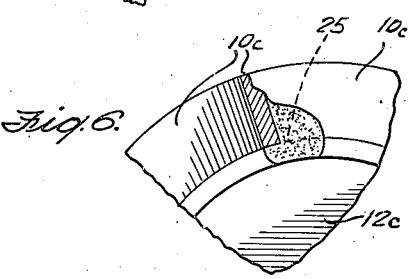
INVENTOR
RICHARD D. CLEMSON
ATTORNEYS Patented Jan. 2, 1940

2,185,833

UNITED STATES PATENT OFFICE 2,185,833

MOWER

Richard D. Clemson, Middletown, N. Y., assignor to Clemson Bros., Inc., Middletown, N. Y., a corporation of New York Application June 18, 1937, Serial No. 148,836

7 Claims. (Cl. 56—294)

This invention relates to mowing and cutting machines.

More particularly the invention relates to lawn mowers of the rotary reel type.

The common type of lawn mower prior to my invention has been one in which a rotary reel and a bed knife respectively, are mounted between side frames on which respectively are mounted also ground wheels or rollers by which the assembly is carried. The rotary reel is made up ordinarily of a plurality of fly knives each following a cylindrical spiral form and spaced apart so that their edges lie in a common geometrical cylinder. Upon rotating, therefore, these fly knives contact progressively along their length with the straight edge of the bed knife and thus form a shear acting progressively from one end to the other of the bed knife.

In the manufacture of these reels, the knives are commonly preformed to the desired spiral shape and are then riveted to preformed spiders by which they are secured to a central shaft through which the rotary driving torque is applied. In the forming of the knives, slight differences in the characteristics of the metal or the treatment to which they are subjected results in small deviations from the desired form, and in the assembly, these deviations are removed by the necessity for conformance to the shape of the respective spiders to which they are secured. This results in a straining of the fly knives as they are assembled and secured in the reel assembly.

When the reel has been ground to the accurate geometrical cylinder and is first put into use this straining causes no difficulty and the accurate shear between the cylindrical reel and the bed knife may work perfectly. In the ordinary use of such a lawn mower, however, the fly knives are subjected to repeated shocks due to the fact that sticks and stones and nails or pieces of wire, etc., which may be lying in the grass of the lawn are caught between the knives, and since they cannot pass through the shear, tend to stop the rotation of the reel against its own momentum and with a consequent severe shock. In most cases the fly knives are designed to withstand these shocks to which the reel is normally subjected; but, if the knife is already strained in the same direction as that in which the shock acts, the result may be to produce a permanent distortion in the blade notwithstanding that the blade was originally designed and constructed with sufficient ruggedness to have withstood such a shock if there had been no initial strain.

Once a permanent distortion of this kind has been introduced into the reel, the perfect shear contact between that part of the reel and the bed knife is destroyed and the fly knife may be bent out beyond the cylindrical surface so that upon each rotation it hammers against the bed knife, destroying the cutting edge on both the bed knife and the fly knife. I have found that, to a substantial extent, the clatter which has been universally associated with mowing machines of this type is due to such distortion. Moreover, such distortion results in reduced efficiency of cutting and increased friction between the fly knives and the bed knife and thus greatly increases the work necessary to operate such a mower.

The common methods of sharpening a lawn mower do not correct this condition because they do not take account of the different distortions of the different blades. Thus, for example, if the grinding compound is placed on the edges of the blade and the blades operated so that the fly knives grind against the bed knife the result will be that the high point on each fly knife will grind against the bed knife forming a corresponding depression in the latter with the consequence that the other fly knives will not contact at all. The only way in which this can be corrected is by removing the reel from the machine and grinding it again to a true cylindrical form upon a lathe and regrinding the bed knife to a straight edge.

Accordingly, it is one object of the invention to provide a mower of the rotating reel type which will remain sharp and in adjustment under conditions such that an ordinary lawn mower could not do so.

Another object of the invention is to provide a lawn mower of the rotary reel type which will operate quietly.

Another object of the invention is to produce a lighter, more economical and rugged construction than has heretofore been used in the reels of rotary type lawn mowers.

With these and other objects in view my invention contemplates use in such a mower of a reel with fly knives free from strain, and this I achieve according to my invention by determining the position of the point of attachment between the fly knives and the spiders to which they are secured, by the fly knives themselves. Thus, instead of fitting the fly knives into slots or riveting them onto ears on a preformed spider, as has been done in the prior art, the spider is secured to the fly knives, according to my invention, by fusion or molding onto or around the knife while the material of which the spider is formed is in a relatively fluent condition so that it does not cause a strain of the fly knife and is set in this relation so as to form a rigid and strong fastening between the spider and the fly knife.

Obviously, if the spiders are in the form of relatively thin slotted discs or similar members not more than two of these may be preformed, since regardless of the form of the knives they will adjust themselves to any two fixed points without introducing strain into the knife itself. I have found, however, that almost any mechanical fastening which gives sufficient rigidity of engagement between the spider and the fly knife at the two points will have sufficient breadth so that it is likely to introduce some appreciable strain. I, therefore, form at least all but one and advantageously and preferably all of the spiders by casting, molding, welding in situ, or other process by which the point of fastening is determined accurately and freely by the fly knife itself and without the necessity of conforming its shape to any preformed member.

In the accompanying drawing I have shown a preferred embodiment of my invention and various modifications thereof. It is to be understood that these are not intended to be either exhaustive or limiting of the invention, but on the contrary are chosen for the purposes of illustrating the invention, in order that others skilled in the art may so fully understand the invention, its principles and the application thereof that they may embody it and adapt it in numerous forms, each as may be best suited to the requirements of its particular use.

In this drawing:

Fig. 1 is a view in perspective of a mower reel embodying my invention;

Fig. 2 is a sectional view of a mower embodying my invention;

Fig. 3 is a plan view of a mold assembly according to my invention;

Fig. 4 is a fragmentary view partly in elevation and partly in section of another modified form of the invention, assembled but not yet secured;

Fig. 5 is a fragmentary top plan view of the embodiment illustrated in Fig. 4, but after the fly knife has been secured to the reel;

Fig. 6 is a fragmentary view similar to Fig. 4 but showing another embodiment of the invention; and Fig. 7 represents a section on line 7—7 of the mold shown in Fig. 3.

Referring first to Fig. 1, the reel there shown comprises five substantially identical fly knives 10, each of which is preformed, e. g., as a forging, with a cylindrical spiral form. Each of the knives is radially positioned with respect to the drive shaft 11 and the knives are equally spaced about the shaft so that, with five, as shown, they respectively form angles of 72° at the center.

These fly knives 10 are held in this relation to the shaft 11 and to one another by the spiders 12 formed in situ, e. g., by die-casting.

The inner edge 14 of the fly knives 10 forms an angle of not more than 72° with the straight forward face 15, or to put this in another way, the inner edge 14 is parallel to the forward face 15 of the next preceding fly knife 10, or advantageously even diverges from it in a direction away from the shaft 11. By this relationship the sections 16 of the sectional mold or casting die shown in Fig. 3 are readily removable in a direction parallel to the face 15 of the adjacent fly knife.

As will be observed from the showing of Fig. 3 the sectional mold in the preferred example is divided along the lines 17—17 aligned approximately with the respective faces 15 of the fly knives and each section is notched as shown at 18 to fit approximately the cross section of the fly knife. Although I have said that the line 17 and the notches 18 correspond approximately with the face and dimensions of the respective fly knives it is an important feature of my invention that these are not fitted accurately but leave sufficient clearance to accommodate all normal variations in the form of the fly knives, so that when the fly knives are assembled in this form ready for the molding of the spider there will be no distortion. This leaves gaps between the mold and the fly knives. These gaps are exaggerated in the drawing for better illustration. Ordinarily one or a few hundredths of an inch is ample if the fly-knives are carefully made. In order to assure rapid setting of the material being molded if and when it should flow into this gap between the mold and the fly knife, the molds are advantageously provided with relatively massive lateral projections 19 surrounding the notches 18. The mass of these projections when added to the mass of the fly-knives themselves is sufficient to congeal by chilling any material which is extruded into the space between the two. Thus this gap is closed and the danger of the material being molded leaking away through the gap is avoided.

With a rapid casting technique and the use of metal dies, it may be necessary to provide for additional cooling of these projections, as for example, by circulation of air over the outside of the die.

In order to provide strength and a more secure connection between the spider and the fly knives the latter are preferably drilled, as shown at 26 in Fig. 7, or otherwise under-cut in the area which is covered by the spiders, and the spiders themselves are formed with an enlarged portion or boss 20 over the back of each knife. This boss or heavy backing portion 20 serves to take the shock when the fly knife strikes an obstruction and thereby to avoid loosening of the knife and the spider by the repeated impacts.

In a preferred example I have formed the fly knife 10 of forged steel and have drilled each at the surface where it is engaged by the spiders (see Fig. 7) and the spiders are cast of aluminum or zinc die-casting metal. The central shaft 11 is also formed of steel and is squared or fluted at the surfaces where the spiders embrace the axle, in order to give a more secure engagement between the shaft and the spiders.

In the example illustrated in Fig. 4 the spider 12a, instead of being cast in situ, is a preformed disc having spiraled edges to form the steps 25 against each of which one of the fly knives 10 is positioned. In the assembly of the reel, discs 12a are first assembled on a shaft 11 to which they are secured, e. g., by welding. The discs are then rotated to a position in which the step 25 and the fly knife 10 are held together by gravity and without strain or distortion. With the parts thus assembled they may be welded together, e. g., as shown in Fig. 5, or in any other way. To facilitate this welding the step 25 is preferably formed with a bevel or double beveled edge 27 as shown in Fig. 4, and by broken lines in Fig. 5. Instead of forming the step 25 on the disc 12a the disc may be formed with a circular or any other desired form and the fly knives 10c provided with a broader base which may be welded as shown in Fig. 6 to the spider 12c.

It is an advantage of my invention that the reel can be made substantially lighter than was practicable with mowers of the prior art. This results both because the unstrained fly knives are better able to withstand shock with a lighter construction than in the prior art reels, in which a certain amount of initial strain made possible a permanent distortion with a lesser shock; and secondly, because the spiders cast in situ and especially cast of light metals may be made substantially less massive than has been customary in the prior art. The lighter construction of the reel obviously reduces the inertial forces which result when the reel strikes an obstruction, and thus the effect of any reduction in weight is cumulative permitting a further reduction in weight because of the decrease in the maximum force which the reel, and particularly the blades, will have to withstand.

Although I have found it most advantageous to form the spider by die-casting of light metals such as aluminum, zinc and the usual die-casting alloys, the spiders may also be formed of other materials, including the plastics, especially those synthetic plastics developed in recent years which afford high strength per unit of weight, and in addition may give some further compressive resiliency to absorb the shock of the impact when a fly knife strikes an obstruction. Plastic compositions having the requisite physical properties are described in Ellis, The Chemistry of Synthetic Resins, together with discussions of molding and casting technique suitable for the present purpose.

I have used the term "spider" herein in its broad sense to include any structure for holding the fly knives in the desired angularly spaced relation, regardless of whether it assumes a circular disc form as for example in Fig. 6, or a polygonal form as shown in Fig. 2 or any other particular form.

I claim:

1. A rotary reel for a lawn mower comprising an axle, a plurality of spiral fly knives spaced about said axle with their respective cutting edges lying approximately in a geometric cylinder concentric with said axle and a plurality of spiders securing each of said fly knives in spaced relationship about said axle, each of said spiders being homogeneous throughout and intimately embracing said axle and a portion of the back and sides of each of said fly knives sufficiently to maintain said fly knives and said axle in operative position by friction.

2. A rotary reel for a lawn mower comprising an axle, a plurality of spiral fly knives spaced about said axle with their respective cutting edges lying approximately in a geometric cylinder concentric with said axle and a plurality of spiders securing each of said fly knives in spaced relationship about said axle, each of said spiders being homogeneous throughout and intimately embracing said axle and a portion of the back and sides of each of said fly knives sufficiently to maintain said fly knives and said axle in operative position by friction, said axle being fluted at each of the portions thereof embraced by one of said spiders.

3. A rotary reel for a lawn mower comprising an axle, a plurality of spiral fly knives spaced about said axle with their respective cutting edges lying approximately in a geometric cylinder concentric with said axle and a plurality of spiders securing each of said fly knives in spaced relationship about said axle, each of said spiders being homogeneous cast metal throughout and intimately embracing said axle and a portion of the back and sides of each of said fly knives sufficiently to maintain said fly knives and said axle in operative position by friction.

4. A rotary reel for a lawn mower comprising an axle, a plurality of spiral fly knives spaced about said axle with their respective cutting edges lying approximately in a geometric cylinder concentric with said axle and more than two spiders securing each of said fly knives in spaced relationship about said axle, each of said spiders being homogeneous cast metal throughout and intimately embracing said axle and a portion of the back and sides of each of said fly knives sufficiently to maintain said fly knives and said axle in operative position by friction, said axle being fluted at each of the portions thereof embraced by one of said spiders.

5. A rotary reel for a lawn mower comprising an axle, a plurality of spiral fly knives spaced about said axle with their respective cutting edges lying approximately in a geometric cylinder concentric with said axle and a plurality of spiders securing each of said fly knives in spaced relationship about said axle, each of said spiders being homogeneous throughout and intimately embracing said axle and a portion of the back and sides of each of said fly knives sufficiently to maintain said fly knives and said axle in operative position by friction, each of said knives having at least one opening from side to side filled by a portion of said spider in the region of said fly knife embraced by one of said spiders.

6. A rotary reel for a lawn mower comprising an axle, a plurality of spiral fly knives spaced about said axle with their respective cutting edges lying approximately in a geometric cylinder concentric with said axle and more than two spiders securing each of said fly knives in spaced relationship about said axle, each of said spiders being homogeneous cast metal throughout and intimately embracing said axle and a portion of the back and sides of each of said fly knives sufficiently to maintain said fly knives and said axle in operative position by friction, each of said knives having at least one opening from side to side filled by a portion of said spider in the region of said fly knife embraced by one of said spiders.

7. A rotary reel for a lawn mower comprising an axle, a plurality of spiral fly knives spaced about said axle with their respective cutting edges lying approximately in a geometric cylinder concentric with said axle and more than two spiders securing each of said fly knives in spaced relationship about said axle, each of said spiders being integral throughout and intimately embracing said axle and a portion of the back and sides of each of said fly knives sufficient to maintain said fly knives and said axle in operating position and each of said fly knives being substantially unstressed by said spiders.

RICHARD D. CLEMSON.